C. E. TOMLINSON.
TIME RECORDER.
APPLICATION FILED AUG. 10, 1911.

1,110,085.

Patented Sept. 8, 1914.
5 SHEETS—SHEET 2.

Fig. 2.

C. E. TOMLINSON.
TIME RECORDER.
APPLICATION FILED AUG. 10, 1911.

1,110,085.

Patented Sept. 8, 1914.
5 SHEETS—SHEET 4.

WITNESSES:
Chas H. Young
S. Davis

INVENTOR
Charles E. Tomlinson
BY
Parsons Black Bodice
ATTORNEYS

UNITED STATES PATENT OFFICE.

CHARLES E. TOMLINSON, OF SYRACUSE, NEW YORK, ASSIGNOR, BY MESNE ASSIGN-
MENTS, TO INTERNATIONAL TIME RECORDING COMPANY OF NEW YORK, OF
ENDICOTT, NEW YORK, A CORPORATION OF NEW YORK.

TIME-RECORDER.

1,110,085.  Specification of Letters Patent.  Patented Sept. 8, 1914.

Application filed August 10, 1911. Serial No. 643,286.

*To all whom it may concern:*

Be it known that I, CHARLES E. TOMLINSON, of Syracuse, in the county of Onondaga and State of New York, have invented a certain new and useful Time-Recorder, of which the following is a specification.

This invention relates to recording machines and has for its object a particularly simple and efficient means for automatically controlling the positions of the records on the record sheets or cards; and it consists in the combinations and constructions hereinafter set forth and claimed.

In describing this invention, reference is had to the accompanying drawing in which like characters designate corresponding parts in all the views.

Fig. 2ª is an enlarged elevation of the means for supporting the type wheels and contiguous parts.

This invention comprises, generally, a recording machine, a card holder detachable from the machine, the machine having a passage or guide for the card holder, and mechanism for automatically determining successive positions of the card holder in the passage, said mechanism being arranged to be operated by the card holder during the movement thereof into the passage. This recording machine may be of any desirable form, size and construction, and is here shown as a time recorder comprising, generally, a time movement 1, a printing element or type wheels 2 connected to the time movement to be operated thereby by means of a shaft 3, intermeshing miter gears 4, 5 mounted respectively on the shaft 3 and on a shaft 6 connected to the main shaft of the time movement 1 by means of gears 7, 8 mounted respectively on the shaft 6 and main shaft of the time movement 1. The time recorder also comprises a suitable inclosing case. The time recorder is also formed with a passage or guide in which the card holder is movable into a position opposed to the type wheels 2, and the type wheels 2 and card holder have relative transverse movement for determining the positions of the records transversely of the card, and also relative movement toward and from each other for effecting the printing of the record.

The mechanism for automatically determining successive positions of the card holder in the passage comprises, generally, two elements, one a series of consecutively arranged shoulders, and the other a shifting means, one of said elements being movable with the card holder in the passage or guide of the machine, and the other being located preferably in the passage in position to coact with one of said shoulders when the card holder is moved into the passage, said mechanism operating to locate in adjacent spaces successive records on the card of any one of the holders irrespective of the number of the registrations on the cards of other holders, it being understood that one card and holder is assigned to each workman, either for keeping the time the workman enters and leaves the place of employment, or the time devoted to different jobs on which the workman is employed.

In the illustrated embodiment of my invention, the passage or guide 9 of the time recorder is formed with a circular mouth 10, and the card holder is in the form of a plug 11 mounted on a suitable support 12, the plug supporting a card 13 on its periphery and being movable into the passage or guide 9 into a position opposite the printing element or type wheels 2, the card being divided into columns 14 representing the days of the week and each column being subdivided into spaces 15 in which consecutive records are made.

Figure 1:
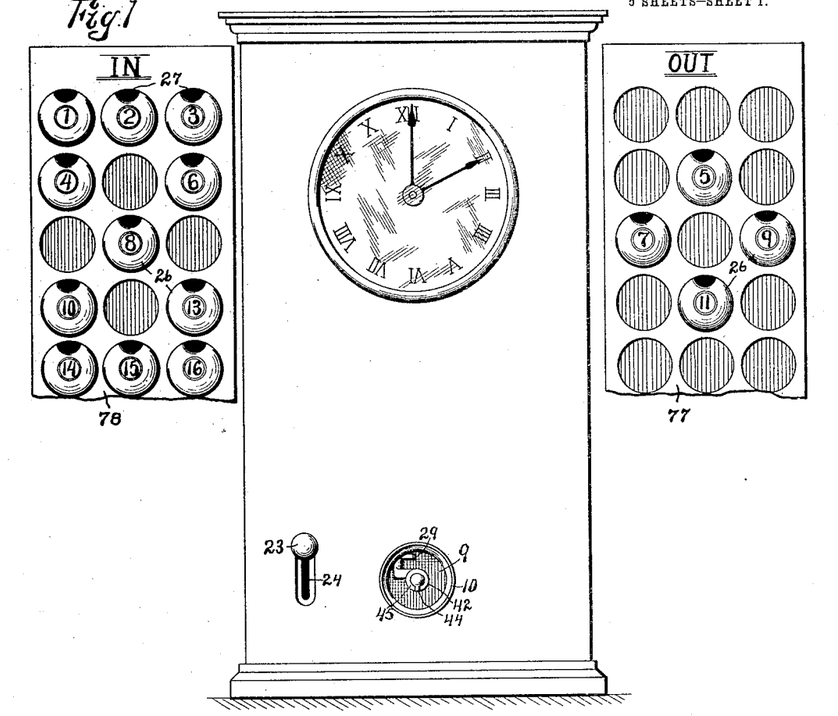
Figure 1 is a front elevation of a time recorder embodying one form of my invention, racks for the card holders being also shown on opposite sides of the machine.
Figure 2:
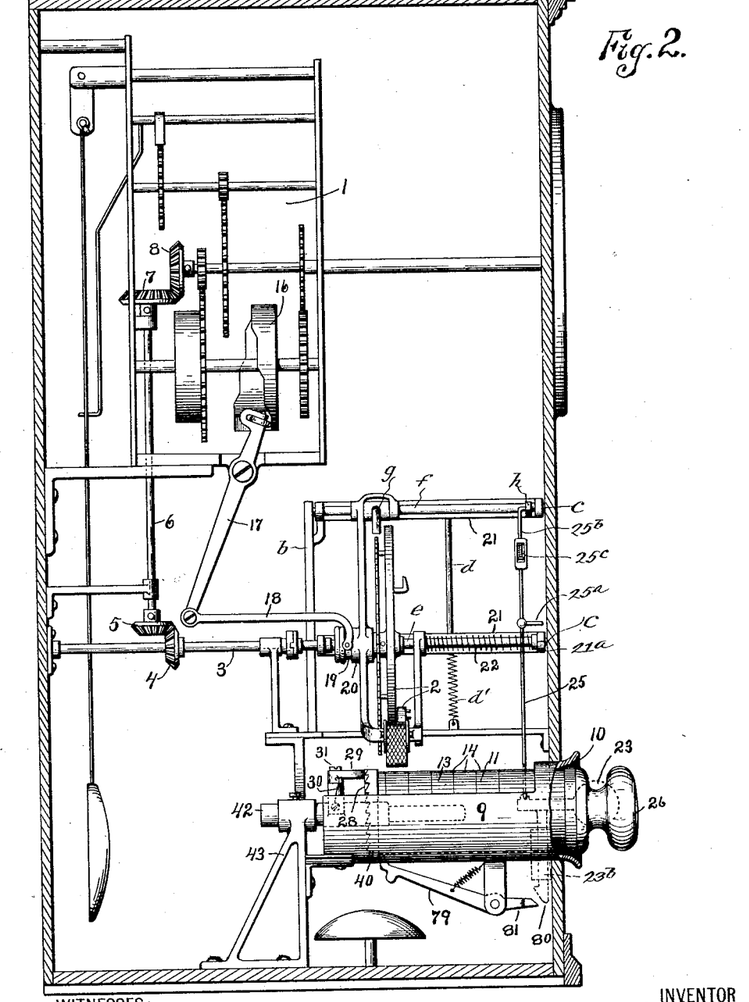
Fig. 2 is an enlarged vertical sectional view of the machine shown in Fig. 1.
Figure 2A:
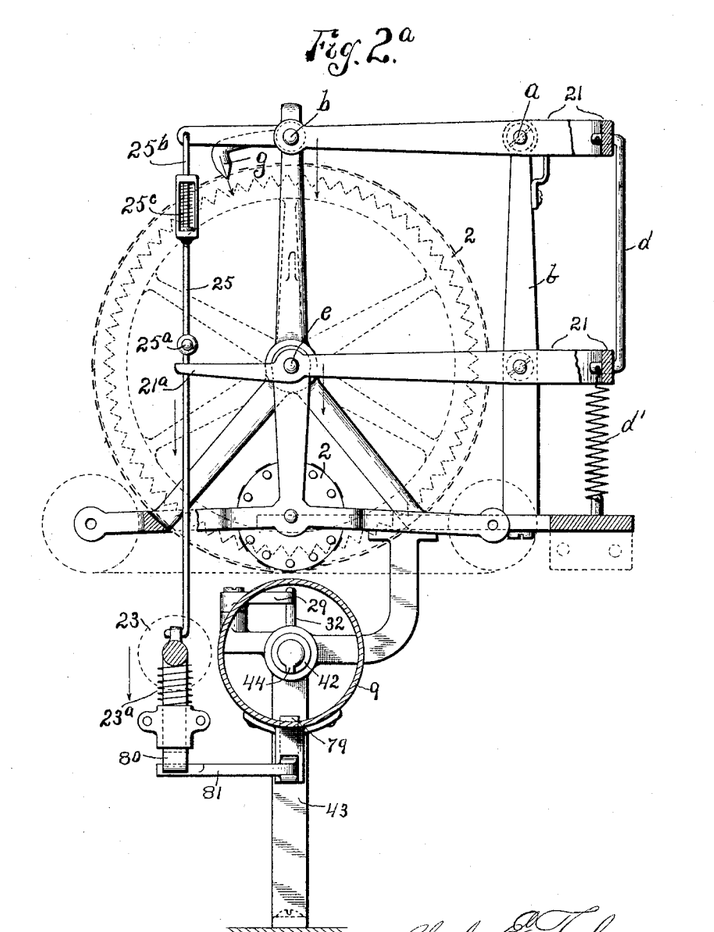
Figure 3:
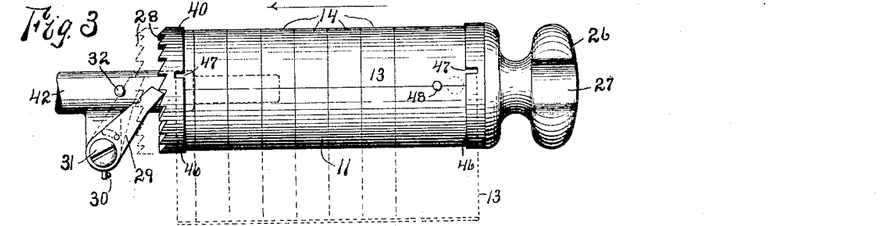
Fig. 3 is an elevation of a card holder and contiguous parts.

In the embodiment of my invention illustrated in Fig. 2, the relative movement of the printing element and card holder for bringing the different columns 14 to the printing line is effected automatically by shifting the type wheels 2 axially, such shifting movement being here shown as effected by means of a clock-driven stepped cam 16, and power-transmitting means, as a lever 17 pivoted between its ends, one arm thereof coacting with the cam 16, and the other arm being connected to a link 18 having a yoke extending into a circumferential groove 19 on the hub of the carriage 20 for the type wheels 2. Said carriage is movable along an oscillating frame 21 by the cam against the action of a returning spring 22. This frame is oscillated in any suitable manner, and it is here shown as operated by a hand lever 23 for the purpose of effecting the making of a record on the card holder in the passage 9. The lever 23 extends through a slot 24 in the front wall of the case of the clock and is connected within the case to an endwisely movable link 25 connected to the oscillating frame 21 in any suitable manner.

More specifically, as seen in Fig. 2ª, the frame 21 consists of upper and lower yokes, the opposite arms of which are pivoted at —a— to an upright —b— forming part of the supporting element and at —c— to the front of the case of the machine, as seen in Fig. 2. The intermediate part of the yokes are connected by a rod —d— which causes them to move in unison when actuated by the lever 23 which movement is against the action of the returning spring d'. The lower yoke 21 carries a shaft —e— on which the minute type wheel 2 is mounted and the carriage 20 has a bearing on the shaft —e— on which the type wheel 2 is mounted, and also a bearing on the rod —f— connecting the front ends of the upper yoke 21. The carriage 20 is also provided with a bearing for the hour or small type wheel 2 and also with means for supporting the ribbon mechanism, as shown in Fig. 2ª. The link 25 is provided with a shoulder 25ª for engaging a forwardly extending arm 21ª on the lower yoke 21 and is connected to a rocking detent or pawl —g— mounted on the rod —f— and movable with the carriage 20, the detent —g— coacting with an annular rack associated with the minute type wheel to hold the minute type wheel from turning during the printing operation.

As shown the link 25 is connected to a link 25ᵇ through a yielding connection 25ᶜ, the link 25ᵇ being connected to a rock arm —h— connected to the pawl —g—. The connection 25ᶜ is such that during the downward movement of the link 25 by the handle 23, after the pawl —g— engages the annular rack, the link 25 is free to continue its movement to carry the shoulder 25ª into engagement with the arm 25ª. The downward movement of the lever 23 is against the action of a spring 23ª located in a barrel 23ᵇ, Fig. 2, carried on the front wall of the case of the machine.

The shaft —e— on which the large or minute type wheel is mounted is coupled to its driving shaft 3 by a universal coupling consisting of three plates, this coupling being of well known construction and permitting the driven shaft —e— to be moved out of axial alinement with the driving shaft 3 during the printing operations, without uncoupling said shafts. This form of coupling is well known and further description is thought to be unnecessary.

The plug 11 is rotatably mounted on its support 12 which is provided with a handle in the form of a knob 26 having an eccentric surface or notch 27 located on the upper side of the knob in position to engage the thumb of the hand of the operator, this knob being more conveniently held between the thumb and forefinger of the hand than in any other manner. The plug 11 is normally held from rotation on its support, as hereinafter described. Preferably the plug 11 is a hollow drum and is provided at its opposite ends with heads, the head at the advance end being formed with an annular series of shoulders 28 constituting one of the elements of the mechanism for automatically determining successive positions of the card holder, said shoulders coacting with a pivoted shifting pawl 29 forming the other element of said mechanism, the pawl 29 being located in the passage 9 and being normally pressed forward by a spring 30 in position to engage one of the shoulders 28 as the plug 11 approaches the limit of its movement into the passage 9, and to be moved on its pivot 31 against the action of the spring 30 during such inward movement of the plug 11 until said pawl is limited by the stop 32. During the pivotal movement of the pawl it rotates the card holder or plug 11 one step about the support 12.

Figure 4:
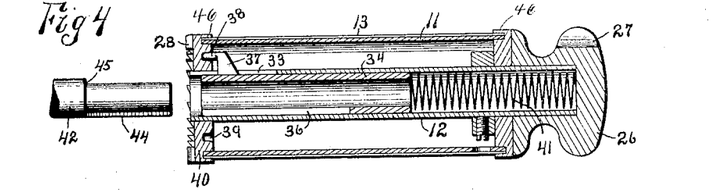
Fig. 4 is a longitudinal sectional view of parts seen in Fig. 3.
Figure 5:
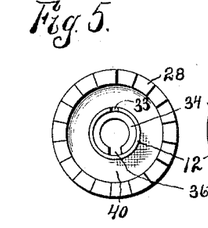
Fig. 5 is an end view of the card holder and its support.
Figure 6:
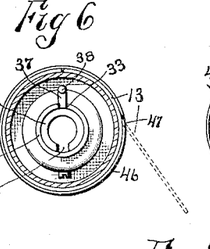
Fig. 6 is a cross sectional view thereof.
Figure 7:
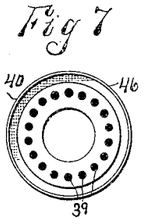
Fig. 7 is an inner face view of the head at the advance end of the card holder.
Figure 8:
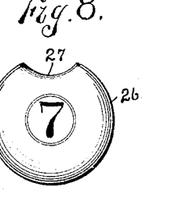
Fig. 8 is a face view of the handle of the support for the card holder.
Figure 9:
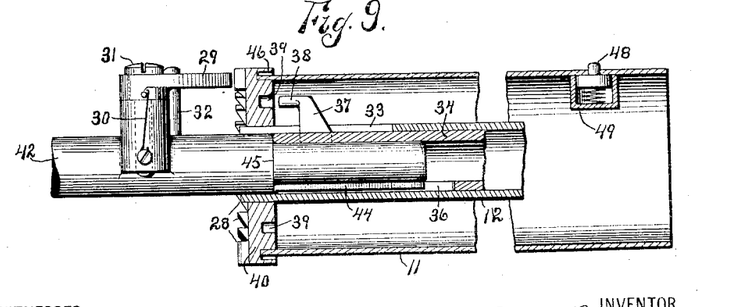
Fig. 9 is an enlarged fragmentary view of the card holder and support therefor, and means for rotating the card holder.

Means is provided for preventing the insertion of the plug 11 and its support into the passage 9 except when the support is held in a certain position, and means is also provided for normally locking the plug 11 from rotation about its support, the locking means being movable out of locking position by the first-mentioned means as the plug and its support approach the limit of its movement into the passage 9. As here shown, the support is formed with an axial socket at its advance end formed with a keyway, and means corresponding in form to the keyway and socket is provided for entering the same when the support is positioned properly to enter the passage 9. Said key also operates to move the locking means out of operative position. As here shown, the support 12 for the plug 11 comprises a tubular portion formed with a lengthwise slot 33 near its advance end, and a slide 34 movable in the tubular portion and having a keyway or slot 36 therein and also a projection 37 extending through the slot 33 and formed with a pin 38, Figs. 4, 6 and 9, for entering any one of the series of holes 39, Figs. 4, 7 and 9, on the inner face of the head 40 at the advance end of the plug 11, there being the same number of holes 39 as shoulders 28. The slide 34 is pushed outwardly in order to engage the pin 38 in one of the holes 39 by a spring 41 located in the tubular part of the support between the slide 34 and the head or handle 26.

The key 42 is supported by a frame member 43, Fig. 2, which supports the guide 9, is axially alined with the passage 9, and is provided with a feather 44 for entering the keyway 36 and with a shoulder 45 for engaging the advance end of the slide 34 and pressing the slide 34 rearwardly against the action of the spring 41 during the movement of the plug and its support into the guide or passage 9. Thus during the movement of the plug and its support into said passage 9, the support must be so positioned that the key 42 will fit within the slide 34 so that the inward movement of the plug and support will withdraw the pin 38 out of one of the holes 39 prior to the engagement of the annular series of shoulders 28 with the pawl 29. Said pawl 29 is here shown as supported by the key 42. The positioning of the plug 13 and its support in juxtaposition with the key 42 is facilitated by the surface 27 of the handle 26, as such surface is arranged on the upside of the knob in such position that the thumb naturally engages therewith. As seen in Figs. 3, 4, 7 and 9, the plug 11 is also provided with annular flanges 46 at its ends overhanging and spaced apart from the peripheral surface thereof, these flanges being formed with slots 47 through which the edges of the card are inserted when the card is being placed in position on the plug. When the card has been placed on the plug, it is prevented from changing its position thereon by means of a spring pressed shoulder 48, Fig. 9, located in a socket 49 within the plug, the shoulder 48 projecting above the periphery of the plug in position to enter alined notches 50 on opposing edges of the card. The shoulder is located nearer one end of the plug than the other and the notches are also located nearer one side edge of the card than the other in order that the card will be placed in proper position on the plug.

Figure 11:
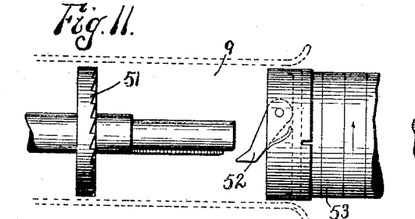
Figs. 11, 12, 13 and 14 are views similar to Fig. 9 of other forms of my invention.
Figure 12:
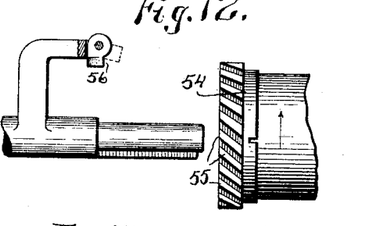

Although I preferably form the annular series of shoulders 28 on the plug and locate the pawl 29 within the guide or passage 9 yet, as seen in Fig. 11, such annular series of shoulders, designated 51, may be located in the guide or passage 9, and the pawl 52 carried at the end of the plug 53; or as seen in Fig. 12, the annular series of shoulders may be on the peripheral face of the head of the plug designated 54, instead of on the end thereof, and in the form of inclined surfaces or teeth 55 with which the pawl 56 coacts during the inward movement of the plug, the pawl remaining rigid during the inward movement of the plug and yielding, as indicated in dotted lines, when the plug is withdrawn. If desired, as seen in Figs. 13 and 14, both elements of the positioning mechanism may be carried either by the plug, or both may be detached from the plug and located within the passage 9.

Figure 13:
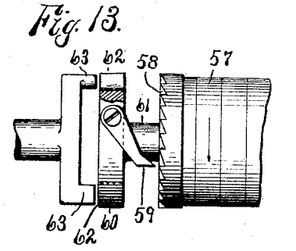

In Fig. 13, the plug 57 is provided with teeth 58 similar to the teeth 28, and the pawl 59 coöperating therewith is pivoted to a disk 60 carried by a key 61 corresponding to the key 42, the disk 60 being formed with notches 62 which must be alined with prongs 63 in order to properly position the plug in the passage 9.

Figure 14:
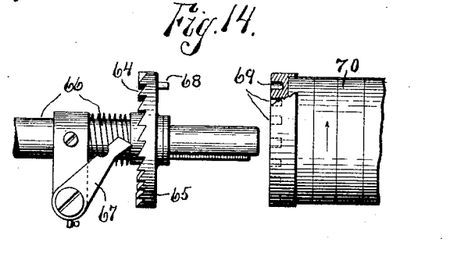

In Fig. 14, the annular series of shoulders 64 is provided on the disk 65 slidable axially of the key 66 which is located and fixed within the passage 9 and the pawl 67 is mounted similarly to the pawl 29 in the preferred form of my invention. The disk 65 is formed with a pin 68 for entering one of a series of sockets 69 in the advance end of the plug 70, this pin 68 and socket 69 locking the plug and disk together.

Figure 15:
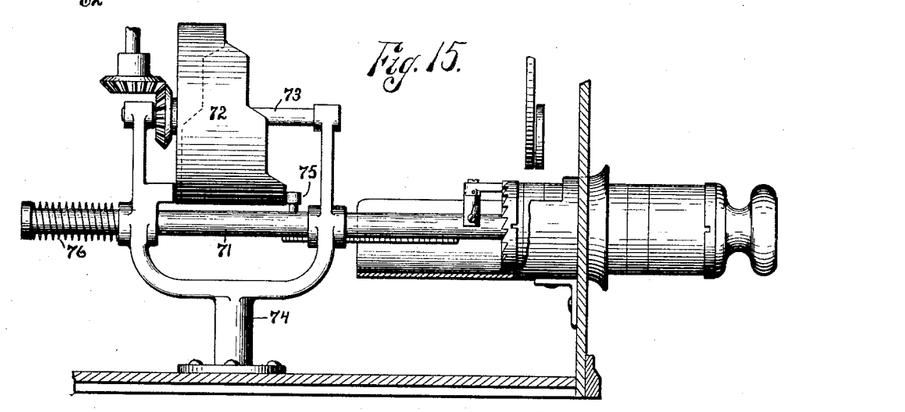
Fig. 15 is a modified form of mechanism shown in Fig. 2.

Although in Fig. 2, the type wheels are shown as shiftable laterally from one column to another on the card, yet as seen in Fig. 15, the type wheels may remain stationary and the distance that the plug can be inserted in the socket be automatically determined by the clock movement, such result being effected by shifting the key 71, corresponding to the key 42, axially to different positions. Such axial movement is effected by means of the clock actuated stepped cam 72 mounted on the shaft 73 supported by the frame member 74 in which the key 71 is slidable, the cam 72 bearing against a shoulder or roller 75 on the key 71. The movement of the key by the cam is against the action of the returning spring 76.

Figure 10:
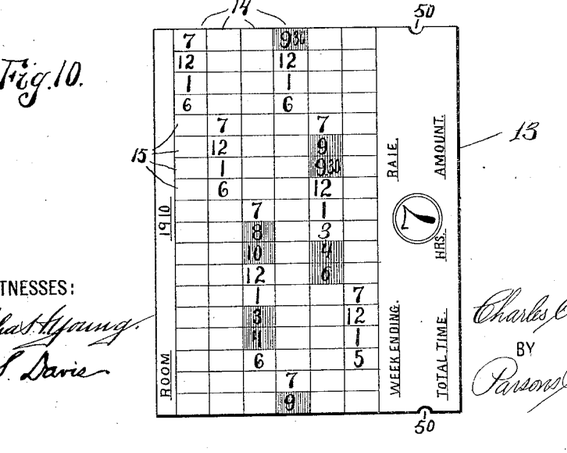
Fig. 10 is a plan of one form of card for this time recorder.

In operation the various card holders assigned to the workmen are arranged in a rack as 77 located in a position adjacent to the clock, and when the workmen enter the factory they take the plugs assigned to them from the rack 77 and insert them into the clock and replace them in another rack 78 located near the machine. During the movement of the plug into the passage 9 after the same has been properly positioned with respect to the key 42, the movement of such plug engages one of the teeth 28 with the pawl 29 causing the pawl to rotate the plug one step prior to the printing operation. When the plug has been inserted to its full extent into the socket, a suitable spring pressed locking lever 79 Fig. 2 engages with the head 40 at the advance end of the plug and prevents withdrawal of the plug until the operating lever 23 is depressed for effecting the movement of the type wheels 2 toward and from the card on the plug to effect the making of a record, the downward movement of said lever hooking a latch 80 on the tail 81 of the lever 79, so that during the return of the lever 23 to its normal position it tilts the lever 79 and releases the plug so that the spring 41 which has been tensioned during the movement of the plug into the passage 9, shoots the plug partly out of the passage 9. As before stated the registrations in the different longitudinal columns designating the days of the week are effected automatically by effecting relative movement in a transverse direction of the type wheels 2 and the card holder 13 and successive registrations as "in" and "out" registrations of any one workman are placed in adjoining spaces in the column by means of the elements 28 and 29. After the card has been removed from the holder the registrations will appear on the card after the manner shown in Fig. 10 which illustrates that workman No. 7 on the first and second days, that is Monday and Tuesday, entered at 7:00 and left at 12:00, returned at 1:00 and worked until 6:00, the registrations for the second day continuing from those of the first day but being located in the next column. The registrations for Wednesday show that the workman was absent between the hours of 8:00 and 10:00 in the morning and 3:00 and 4:00 in the afternoon, such irregular registrations being indicated in different colors effected by the use of a two color ribbon and shifting device therefor. The Thursday registrations show that the workman entered at 7:00 and was out from 9:00 until 9:30 having regular registrations thereafter. As the entering registrations are at the bottom of the Thursday column, the remainder thereof appear at the top of such column due to the rotation of the card holder by the shoulders 28 and 29. Thus registrations for succeeding days continue from those of the preceding days but are in the next columns, and the position of the first registration in any column after the first, depends on the number of registrations made in the preceding columns.

Figure 16:
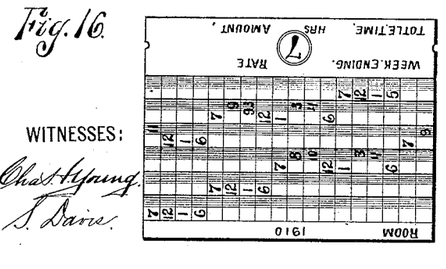
Fig. 16 is another form of card.
Figure 17:
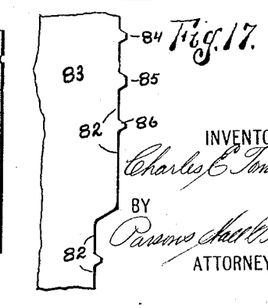
Fig. 17 is a fragmentary part of a clock-driven cam used when the card shown in Fig. 16 is employed.

As seen in Fig. 16, the irregular records, instead of being made in a different color from the regular records, may be made in the same column as the regular records but out of alinement with the regular records. Such placing of regular and irregular records out of alinement may be effected by providing each step or face 82 of a clock-driven cam 83, Fig. 17, corresponding to either the cam 16, Fig. 2, or 72, Fig. 15, with high points 84, 85 and 86 at intervals which either shift the type wheels 2 or card holder 11 laterally one half column, the high points 84, 85 and 86 coming into action respectively at certain periods as from 6:30 to 7:00 a. m.; 12:00 to 1:00 p. m. and 6:00 to 7:00 p. m. The offsetting of the irregular periods facilitates the reading of the records.

My time recorder and card are particularly advantageous in that ample room is provided for "in" and "out" registrations, or for the registrations denoting the beginning and ending of jobs; and further in that the positioning of the records on the card is entirely automatically determined.

What I claim is:

1. The combination of a recording machine, a card holder detachable from the machine, the machine having a passage for the card holder, and mechanism for automatically determining successive positions of the card holder in the passage, said mechanism being arranged to be operated by the card holder during the movement thereof into the passage, substantially as and for the purpose described.

2. The combination of a card holder for an individual record card of recording machines having card guides, the holder being detachable from the machine, and mechanism for automatically determining successive positions of the card holder relatively to the guide of the recording machine, said mechanism comprising means carried by the card holder and a coöperating member carried by the machine, substantially as and for the purpose specified.

3. The combination of a recording machine, a card holder detachable from the machine, and mechanism for automatically determining successive positions of the card holder in the passage, said mechanism being arranged to be operated by the card holder during the movement thereof into the passage, and a portion of said mechanism being carried by the card holder and being successively shiftable, substantially as and for the purpose set forth.

4. The combination of a card holder for an individual record card of recording machines having card guides, the holder being detachable from the machine and mechanism for automatically determining successive positions of the card holder relatively to the guide of the recording machine, said mechanism comprising means including a successively shiftable part carried by the card holder, substantially as and for the purpose described.

5. The combination of a recording machine, a card holder detachable from the machine, the machine having a passage for the card holder, and mechanism for automatically determining successive positions of the card holder in the passage, said mechanism comprising a series of consecutively arranged shoulders provided on the card holder, and means in the passage for coacting with the shoulders during the movement of the card holder into the passage, substantially as and for the purpose specified.

6. The combination of a recording machine, a card holder detachable from the machine, the machine being formed with a passage for the card holder, and mechanism for automatically determining successive positions of the card holder in the passage, said mechanism comprising a series of consecutively arranged shoulders provided on the card holder, and shifting means for coacting with the shoulders to determine successive positions of the card holder in the passage, said means comprising a pawl arranged in the passage in position to coact with one of said shoulders during each insertion of the card holder into the passage, substantially as and for the purpose set forth.

7. The combination of a recording machine, a card holder detachable from the machine, the machine having a passage for the card holder, and the machine including a printing element, the printing element and the card holder having relative transverse shifting movement for effecting the positioning of the records in different transverse columns on the card, and also having relative movement toward and from each other for effecting the printing operation, means for effecting such relative movements, and mechanism for automatically positioning the card holder in the passage to position successive records in any one column in adjacent spaces in said column, said mechanism being arranged in position to be operated during the movement of the said holder into the passage, substantially as and for the purpose described.

8. The combination of a recording machine, card holders detachable from the machine, the machine having a passage for receiving the card holders one by one, and mechanism for locating in adjacent spaces successive records on the card of any one of the holders irrespective of the number of successive registrations on the cards of other holders, said mechanism being arranged in position to coact with the card holder when the same is inserted in the passage, substantially as and for the purpose specified.

9. The combination of a recording machine, card holders detachable from the machine, the machine having a passage for receiving the card holders one by one, and mechanism for locating in adjacent spaces successive records on the card of any one of the holders irrespective of the number of successive registrations on the cards of the other holders, said mechanism comprising two elements, one a series of consecutively arranged shoulders, and the other shifting means, one of said elements being movable with the card holder in the passage, and the other being located in the passage in position to coact with the element movable with the card holder when the card holder is moved into the passage, substantially as and for the purpose set forth.

10. The combination of a recording machine, card holders detachable from the machine, the machine having a passage for receiving the card holders one by one, each card holder being provided with a series of consecutively arranged shoulders, and a pawl arranged in position to coact with one of the shoulders of the card holder during the insertion of the card holder in the passage, and move said shoulder out of operative relation to the pawl and present the next shoulder to coact with the pawl during the next insertion of the same holder, substantially as and for the purpose described.

11. The combination of a recording machine, and a detachable card holder, the machine being formed with a passage for the card holder, and the card holder comprising a plug movable endwisely in the passage and supporting the card on its periphery, substantially as and for the purpose specified.

12. The combination of a recording machine, and a detachable card holder, the machine being formed with a passage for the card holder, and the card holder comprising a rotatable plug movable endwisely in the passage and supporting the card on its periphery, substantially as and for the purpose set forth.

13. The combination of a recording machine, a detachable card holder, the machine having a passage for the card holder, and the card holder comprising a rotatable plug movable endwisely into the passage and supporting the card on its periphery, and mechanism for rotating the plug a predetermined amount upon each insertion thereof into the passage, substantially as and for the purpose described.

14. The combination of a recording machine, a card holder detachable from the machine, the machine having a passage for the card holder, and the card holder comprising a rotatable plug movable into the passage, and mechanism for rotating the plug a predetermined amount upon each insertion thereof into the passage, said mechanism comprising two elements, one an annular series of shoulders, and the other a shifting pawl for coacting with said shoulders, one of said elements being movable with the plug in the passage, and the other being located in position to coact with the element associated with the plug as the plug approaches the limit of its movement into the passage, substantially as and for the purpose specified.

15. The combination of a recording machine, a card holder detachable from the machine, the machine having a passage for the card holder, and the card holder comprising a rotatable plug movable endwisely into the passage, and mechanism for rotating the plug a predetermined amount upon each insertion of the plug into the passage, said mechanism comprising two elements, one an annular series of shoulders, and the other a shifting pawl for coacting with said shoulders, one of said elements being carried by and movable with the plug, and the other being located in position to coact with the element associated with the plug as the plug approaches the limit of its movement into the passage, substantially as and for the purpose set forth.

16. The combination of a recording machine, a card holder detachable from the machine, the machine having a passage for the card holder, and the card holder comprising a rotatable plug movable endwisely into the passage, and mechanism for rotating the plug a predetermined amount upon each insertion of the plug into the passage, said mechanism comprising an annular series of shoulders carried by the plug and means located in the passage for coacting with one of the shoulders as the plug approaches the limit of its movement into the passage, to move said shoulder out of operative relation to said means and thereby rotate the plug a single step and present the next shoulder in position to coact with said means during the next insertion of the plug, substantially as and for the purpose described.

17. The combination of a recording machine, card holders detachable from the machine, the machine having a passage for receiving the card holders one by one, each card holder comprising a rotatable plug movable in the passage, and mechanism for locating in adjacent spaces successive records on the card of any one of the holders irrespective of the number of the successive registrations on the cards of the other holders, said mechanism comprising two elements, one an annular series of shoulders, and the other shifting means for coacting with said shoulders, one of said elements being movable with each card holder, and the other of said elements being located in position to coact with the element movable with the card holder when the card holder approaches the limit of its movement into the passage, substantially as and for the purpose specified.

18. The combination of a recording machine, card holders detachable from the machine, the machine having a passage for receiving the card holders one by one, each card holder comprising a rotatable plug movable endwisely into the passage, and mechanism for rotating the plug a predetermined amount upon each insertion of the plug into the passage, and locating in adjacent spaces successive records on the card of any one of the holders irrespective of the number of successive registrations on the cards of the other holders, said mechanism comprising two elements, one an annular series of shoulders, and the other a shifting pawl for coacting with said shoulders, one of said elements being provided on each plug, and the other being common to all the plugs and located in the passage, substantially as and for the purpose set forth.

19. The combination of a recording machine, a plurality of card holders detachable from the machine, the machine having a passage for receiving the card holders one by one, and the machine including a printing element, each card holder comprising a rotatable plug movable axially in the passage, the printing element and the plug having relative axial movement for effecting the positioning of the records in different transverse columns on the card, and said element and plug also having relative movement toward and from each other for effecting the printing operation, means for effecting such relative movements, and mechanism for rotating each plug a predetermined amount upon each insertion of the plug into the passage, substantially as and for the purpose described.

20. The combination of a recording machine, a plurality of card holders detachable from the machine, the machine having a passage for receiving the card holders one by one, and the machine including a printing element, each card holder comprising a rotatable plug movable axially in the passage, the printing element and the plug having relative axial movement for effecting the positioning of the records in different transverse columns on the card, and said element and plug also having relative movement toward and from each other for effecting the printing operation, means for effecting such relative movements, and mechanism for rotating each plug a predetermined amount upon each insertion of the plug into the passage, said mechanism comprising an annular series of shoulders movable with each card holder into the passage, and a pawl for coacting with the shoulders, the pawl being located in the passage and fixed from movement with the plug, and the pawl being arranged to coact with one of the shoulders as the plug is moved in the passage and to move said shoulder out of operative relation to the pawl and thereby rotate the plug a single step and present the next shoulder in position to coact with the pawl during the next insertion of the plug, substantially as and for the purpose specified.

21. The combination of a recording machine, a detachable card holder in the form of a plug, the machine being formed with a passage for the plug, and a support for the plug, the plug being rotatably mounted on its support, substantially as and for the purpose set forth.

22. The combination of a recording machine, a detachable card holder in the form of a plug, the machine being formed with a passage for the card holder, and a support for the plug, the plug being rotatable on the support, and said support being formed with a handle, substantially as and for the purpose described.

23. The combination of a recording machine, a detachable card holder in the form of a plug, the machine being formed with a passage for the card holder, a support for the plug, the plug being rotatable on its support, and means for coacting with the support to prevent the insertion of the plug and its support into the passage only when the support is in a predetermined position, substantially as and for the purpose specified.

24. The combination of a recording machine, a detachable card holder in the form of a plug, the machine being formed with a passage for the plug, a support for the plug, the plug being rotatable on the support, and being formed with an axial non-circular socket at its end, the plug being rotatable on the support, and means consisting of a key complemental to the socket and fitting in the same as the support and plug are moved into the passage, substantially as and for the purpose set forth.

25. The combination of a recording machine, a detachable card holder in the form of a plug, the machine being formed with a passage for the card holder, and a support for the plug, the support extending axially of the plug and being formed with a handle at one end, the plug being rotatable on its support, and the handle being in the form of a knob having an eccentric thumb engaging face on one side thereof, substantially as and for the purpose described.

26. The combination of a recording machine, a detachable card holder in the form of a plug, the machine being formed with a passage for the plug, a support extending axially of the plug and having a handle at one end, and the plug being rotatable on the support, the handle being in the form of a knob having an eccentric thumb engaging surface on one side thereof, and means in the passage for coacting with the support to prevent the insertion of the plug and its support into the passage only when the support is in a predetermined position, substantially as and for the purpose specified.

27. The combination of a recording machine, a detachable card holder in the form of a plug, the machine being formed with a passage for the plug, a support for the plug extending axially thereof, the plug being rotatable on its support, means for normally holding the plug from rotation, and means in the passage for moving the locking means out of operative position as the plug is moved into the passage, substantially as and for the purpose set forth.

28. The combination of a recording machine, a detachable card holder in the form of a plug, the machine being formed with a passage for the plug, a support for the plug extending axially thereof, the plug being rotatable on its support, means for normally holding the plug from rotation on its support, means in the passage for moving the holding means out of operative position as the plug is moved into the passage, and mechanism for rotating the plug during its movement into the passage and after the holding means has been released, substantially as and for the purpose specified.

29. The combination of a recording machine, a detachable card holder in the form of a plug, the machine being formed with a passage for the plug, a support for the plug extending axially thereof, and the plug being rotatable on its support, means for normally holding the plug from rotation on its support, means in the passage for moving the holding means out of operative position as the plug is moved into the passage, and mechanism for rotating the plug during its movement into the passage and after said means has been released, said mechanism comprising two elements, one a series of annular shoulders, and the other means for coacting with one of the shoulders during the movement of the card holder into the passage, one of said elements being rotatable with the plug in the passage, and the other being non-rotatable therewith, substantially as and for the purpose specified.

30. The combination of a recording machine, a detachable card holder in the form of a plug, the machine being formed with a passage for the plug, a support for the plug extending axially thereof, the plug being rotatable on its support, means for normally holding the plug from rotation on its support, and means for moving the holding means out of operative position and preventing the insertion of the support into the passage only when the support is in a predetermined position, substantially as and for the purpose set forth.

31. The combination of a recording machine, a rotatable card holder in the form of a plug having an internal cavity, the machine being formed with a passage for the plug, a support for the plug, the plug being rotatable on its support, and the support being formed with an axial non-circular socket at its advance end, locking means within the plug for normally holding the plug from rotation on its support, and a key complemental to the socket and fitting into the same as the support and plug are moved into the passage, the key moving the locking means out of its operative position, substantially as and for the purpose described.

32. The combination of a recording machine, and a rotatable card holder in the form of a plug having an internal cavity, the machine being formed with a passage for the plug, a support for the plug, the plug being rotatable on its support, and the support being formed with an axial non-circular socket at one end, locking means within the plug for normally holding the plug from rotation on its support, a key in the passage, the key being complemental to the socket and fitting into the same as the support and plug are moved into the passage, and operating to move the locking means out of its operative position, and mechanism for rotating the plug during its movement into the passage after said locking means has been released, substantially as and for the purpose specified.

33. The combination of a recording machine, a plurality of card holders detachable from the machine, each card holder being in the form of a plug having an internal cavity, and the machine having a passage for receiving the card holders one by one, a support for each plug extending axially thereof, and each plug being rotatable on its support, the recording machine including a printing element, said printing element and the plug having a relative axial movement for effecting the positioning of the records in different transverse columns on the card, and said element and plug also having relative movement toward and from each other for effecting the printing operation, means for effecting such relative movements, locking means carried by the support and extending in said cavity for normally holding the plug from rotation on its support, means in the passage for coacting with the support and the locking means for preventing the insertion of the support into the passage only when the support is in a predetermined position and for releasing said locking means when the support is in such predetermined position, and mechanism for rotating each plug a predetermined amount upon the insertion of the plug into the passage and the release of the locking means, substantially as and for the purpose set forth.

34. The combination of a recording machine, a card holder detachable from the machine, the machine having a passage for the card holder, the card holder comprising a hollow drum for supporting the card on its periphery, the drum being formed with an internal annular series of holes, the support for the drum extending axially thereof and comprising a tube having a handle at one end of the drum, the tube being formed with a lengthwise slot, a slide within the tube having a portion projecting through the slot of the tube into the interior of the drum, said part being provided with a shoulder at its end for coacting with said series of holes, the slide being also formed with a keyway, a spring within the tube tending to force the slide outwardly, and mechanism for automatically determining the successive positions of the card holder in the passage comprising two elements, one an annular series of shoulders, and the other a pawl for coacting with the shoulders, one of said elements being provided on the advance end of the drum, and the other being located in the passage for coacting with the shoulders during the movement of the card holder in the passage, and a key in the passage arranged to enter the advance end of the tubular support, the key having a feather for entering the keyway of the slide, and a shoulder for engaging the advance end of the slide and moving the same axially against the action of said spring, substantially as and for the purpose described.

35. A card holder comprising a drum for supporting a card on its periphery, the drum being provided with a spring-pressed plunger movable above its peripheral surface and arranged nearer one end of the drum than the other, the plunger entering a notch in the card, substantially as and for the purpose specified.

36. A card holder comprising a drum for supporting a card on its periphery, the drum being formed with annular flanges at its ends opposed to and spaced apart from the periphery of the drum, the flanges being formed with alined slots for permitting the insertion of the card therethrough, substantially as and for the purpose set forth.

37. In a time recorder of the individual card type, the combination with a recording machine, of a plurality of card supports insertible individually into the machine and removable therefrom, each of said supports comprising two parts relatively movable, means for holding the parts against movement, and means associated with the recording machine coöperating with means carried by the support for releasing said holding means and advancing one of said parts relatively to the other upon the insertion of the carrier into the machine, substantially as and for the purpose described.

38. In a time recorder of the individual card type, the combination with a recording machine, of a plurality of card supports each comprising two parts having relative movement, means for holding the parts against relative movement, and means associated with the machine coöperating with means carried by the support for releasing said holding means and advancing one of the parts relative to the other upon the insertion of the carrier into the machine, substantially as and for the purpose specified.

39. An individual card carrier comprising two parts relatively movable, shiftable means carried by one of the parts and detachably engaging the other for holding the parts against relative movement, and a series of shoulders on the last-named part corresponding to imprint receiving spaces on the imprint receiving element carried by the support, substantially as and for the purpose set forth.

40. In a time recorder of the individual card type, the combination with a recording machine, of a card support comprising two parts relatively movable, means housed within the support and inaccessible to and beyond the control of the operator for holding the parts against movement, and means associated with the machine for coöperating with the holding means for releasing the same upon the insertion of the carrier into the machine, and mechanism carried by the machine and carrier respectively and coöperating upon the insertion of the carrier into the machine for positively moving one of the aforesaid parts relatively to the other after the releasing of the holding means, substantially as and for the purpose described.

41. In a time recorder and in combination, an imprint making element, a support for the record sheet, means for effecting the adjustment of one of said parts in reference to the other for spacing between successive imprints printed in a column on said record sheet, and means for effecting the adjustment in a different direction for printing irregular records out of alinement with regular records, substantially as and for the purpose specified.

42. In a time recorder and in combination, an imprint making element, a support for the record sheet, and means for shifting one of the parts in reference to the other for spacing between successive records, and means for automatically shifting the parts in a different direction for offsetting irregular from regular records, substantially as and for the purpose set forth.

43. In a workman's time recorder, of the individual card type, a casing and printing mechanism associated therewith including an imprint making element, a spacing mechanism comprising a plurality of parts associated with the card and removable therewith from the casing, each of said parts corresponding to an individual imprint receiving space on the card, and a member associated with the casing and common to all of said parts and adapted to successively coöperate therewith for locating the card in reference to the imprint making element and for successively moving the parts into effective position, substantially as and for the purpose described.

44. In a workman's time recorder of the individual card type, a casing, and printing mechanism located therein including an imprint making element, a card carrier adapted to be inserted into the casing for bringing the card into coöperative relation to the imprint making element and to be removed from the casing, a plurality of stops carried by the carrier, each individual to an imprint receiving space on the card, and means associated with the casing for successively advancing said stops in the movement of the card to printing position, substantially as and for the purpose specified.

45. In a workman's time recorder of the individual card type, a casing, and printing mechanism located therein including an imprint making element, a card carrier adapted to be inserted into the machine for bringing the card into coöperative relation to the imprint making element and to be removed from the casing, a plurality of stops carried by the carrier, each individual to an imprint receiving space on the card, and means associated with the casing for successively advancing said stops in the insertion of the card into printing position, the extent of movement of said stops being beyond the control of the workman, substantially as and for the purpose set forth.

46. In a workman's time recorder of the individual card type, a casing and printing mechanism associated therewith including an imprint making element, a card holder for an individual record card, the holder being insertible into the casing for locating the card in relation to the imprint making element and being removable from the casing, and a non clock actuated mechanism for automatically registering successive spaces on the card with the imprint making element, said mechanism comprising means carried by the card holder, substantially as and for the purpose described.

47. In a workman's time recorder of the individual card type, a casing and printing mechanism associated therewith including an imprint making element, a card holder for an individual record card, the holder being insertible into the casing for locating the card in relation to the imprint making element and being removable from the casing, and a mechanism for automatically registering successive spaces on the card with the imprint making element comprising a plurality of movable abutments associated with the card holder, substantially as and for the purpose specified.

48. In a workman's time recorder of the individual card type, a casing, printing mechanism associated therewith including an imprint making element adapted to make an imprint at a fixed point, a carrier for the card having a plurality of parallel columns and a plurality of imprint receiving spaces in each column, and a series of stop surfaces associated with the carrier, said surfaces being common to all of the columns, and each surface being individual to a corresponding space in each column, and means associated with the casing for coöperating with said stop surfaces, substantially as and for the purpose set forth.

49. The combination with a recording machine including an imprint making element, of a card holder removable from the machine, and means for automatically locating the position of the card in respect to the imprint making element, a part of the mechanism being associated with the machine, and the remainder thereof with the card holder, and being brought into operation during the insertion of the card into the machine, substantially as and for the purpose described.

50. In a workman's time recorder, a casing, a printing element mounted therein, a card holder insertible in the casing and movable to occupy a plurality of positions in reference to the printing element, and means for determining the position of the holder including an element having a limited swinging movement, said element operating during its swinging action as a feeding means, and at the end of its swinging action as a stop, substantially as and for the purpose described.

51. In a workman's time recorder, a casing, a printing element mounted therein, a card holder insertible in the casing and movable to occupy a plurality of positions in reference to the printing element, and means for determining the position of the holder including a shiftable device associated with the carrier and an element associated with the casing and having a limited swinging movement for shifting the shiftable device associated with the carrier, substantially as and for the purpose specified.

52. In a workman's time recorder the combination with a casing and a printing element mounted therein, of a carrier for a card adapted to receive a plurality of imprints in each of a plurality of columns, automatic means for effecting spacing between the successive imprints, and time controlled means for determining the column in which the imprints are made, substantially as and for the purpose set forth.

53. The combination in a recording machine with a casing and an imprint making element mounted therein, of a holder for the card adapted to receive a series of imprints in each of a plurality of columns, means operating automatically on the insertion of the card into the machine for determining the location for the imprint in any column, and time controlled mechanism for determining the column in which the imprint is to be made, substantially as and for the purpose described.

54. In a workman's time recorder, the combination with a casing, and a printing element mounted therein, of a card carrier and a member located in the casing and coöperating with the card carrier for determining the spacing of the card in two directions relatively to the printing element, substantially as and for the purpose specified.

55. In a workman's time recorder, the combination with a casing, and a printing element located therein, of a carrier for the card designed to receive a plurality of imprints in each of a plurality of columns, shiftable means associated with the carrier, and a coöperating element in the casing for effecting spacing on the card in one direction relative to the printing element, by shifting said shiftable means, and a shiftable carrier for said member located in the casing for effecting spacing of the card in another direction relative to said printing element, substantially as and for the purpose set forth.

56. In a workman's time recorder, the combination with a casing, and a printing element located therein, of a carrier for the card designed to receive a plurality of imprints in each of a plurality of columns, shiftable means associated with the carrier, and a coöperating element in the casing adapted to occupy a plurality of positions relative to the printing element and in each of such positions to shift said shiftable means, substantially as and for the purpose described.

57. In a workman's time recorder, the combination with a casing, and a printing element located therein, of a carrier for the card designed to receive a plurality of imprints in a plurality of columns, shiftable means carried by the carrier, and a coöperating element in the casing for effecting spacing of the card in one direction relative to the printing element, and a shiftable carrier for said member located in the casing, for effecting spacing of the card in another direction relative to said printing element, and clock operated mechanism for controlling the shifting movement of the last-named carrier, substantially as and for the purpose specified.

58. In a workman's time recorder, the combination with a casing, and a printing element mounted therein, of a carrier removable from the casing, and carrying a card adapted to receive a plurality of imprints in each of a plurality of columns, and means for automatically effecting spacing between successive imprints, and for determining the column in which an imprint is made, substantially as and for the purpose described.

59. In a workman's time recorder for use with a plurality of card carriers each individual to a workman and each holding a card adapted to receive a plurality of imprints in each of a plurality of columns, said machine comprising a casing having a passage therein common to all of said carriers, and automatic means for effecting spacing between successive imprints on the card of each carrier, a portion of said mechanism being located in the casing of the machine, and another portion thereof being carried by each card carrier, substantially as and for the purpose specified.

60. In a workman's time recorder for use with a plurality of card carriers, each individual to a workman, and each holding a card adapted to receive a plurality of imprints in each of a plurality of columns, said machine comprising a casing having a passage therein common to all of said carriers, and automatic means for effecting spacing between successive imprints on the card of each carrier, a portion of said mechanism being located in the casing of the machine, and another portion thereof being carried by each card carrier, and time-controlled means for determining the column in which the imprint is made on a card inserted within the machine, substantially as and for the purpose set forth.

In testimony whereof, I have hereunto signed my name in the presence of two attesting witnesses, at Syracuse, in the county of Onondaga, and in the State of New York, this 8th day of Aug. 1911.

CHARLES E. TOMLINSON.

Witnesses:
S. DAVIS,
LILLIAN M. DAVIS.

---

Copies of this patent may be obtained for five cents each, by addressing the "Commissioner of Patents, Washington, D. C."